June 30, 1925.
A. MACLACHLAN
1,543,939
PROCESS OF TREATING SEWAGE
Filed March 11, 1922
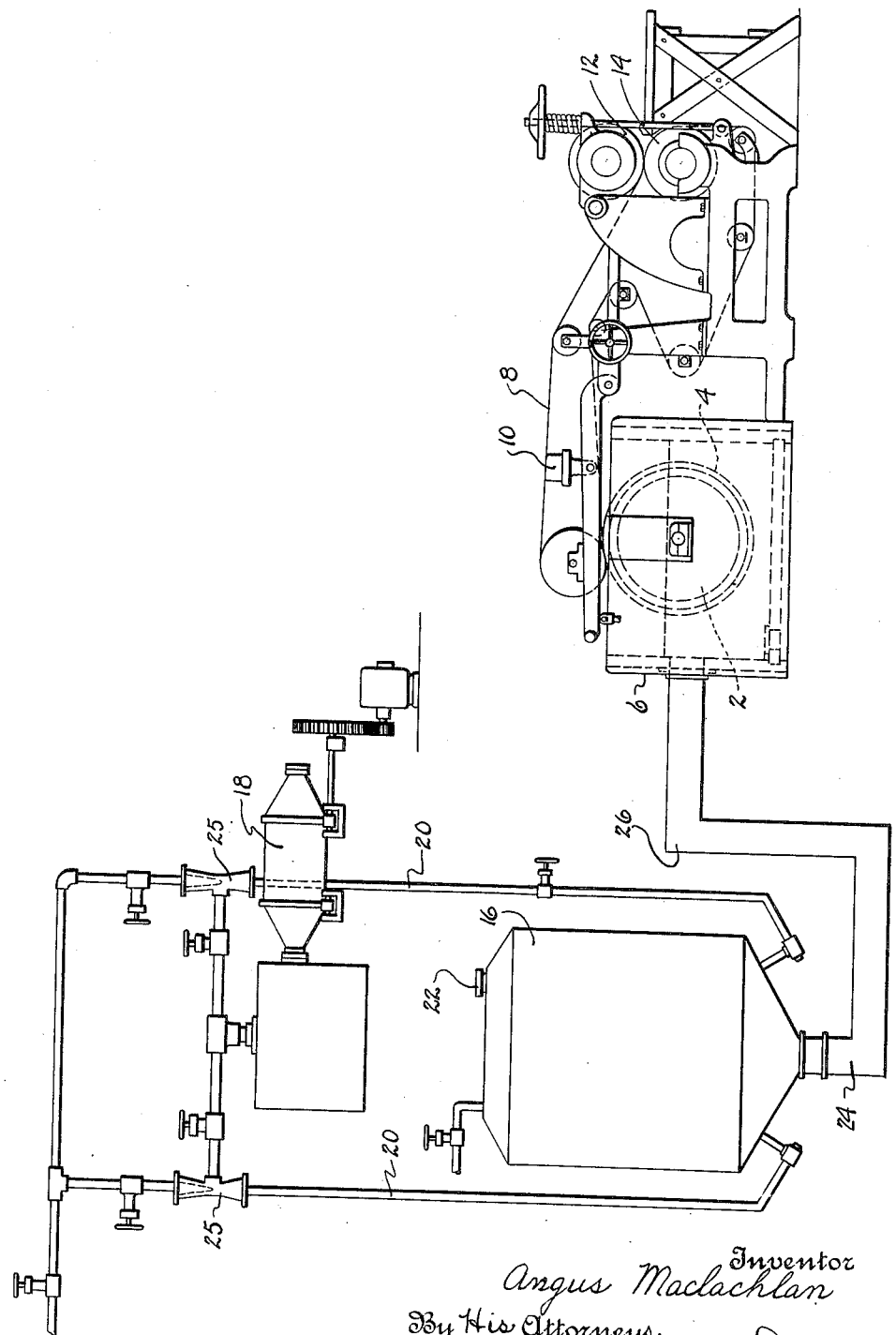
Inventor
Angus Maclachlan
By His Attorneys
Newell and Spencer Patented June 30, 1925.

1,543,939

UNITED STATES PATENT OFFICE.

ANGUS MACLACHLAN, OF PERTH AMBOY, NEW JERSEY, ASSIGNOR TO MACLACHLAN REDUCTION PROCESS CO., OF NEW YORK, N. Y., A CORPORATION OF DELAWARE.

PROCESS OF TREATING SEWAGE.

Application filed March 11, 1922. Serial No. 543,103.

*To all whom it may concern:*

Be it known that I, ANGUS MACLACHLAN, a citizen of the United States, residing at 107 High Street, Perth Amboy, New Jersey, have invented certain new and useful Improvements in Processes of Treating Sewage, of which the following is a clear, full, and exact description.

This invention relates to the treatment of sewage in sewage disposal plants to recover therefrom useful products, and particularly to the treatment of activated sludge to produce therefrom a commercial fertilizer.

Experience has shown that the treatment of sewage by the process known as the activated sludge process is a very desirable method of disposing of sewage because of the exceedingly high purity of the effluent and the entire absence of odors and other operating nuisances. The chief drawbacks to the activated sludge process, particularly in larger installations, has been its excessive operating cost and the difficulties encountered in handling the large volumes of flocculent gelatinous sludge produced by the process, no suitable process having heretofore been devised for effectively drying this material, which, if not immediately cared for after removal from the system, becomes rapidly septic and highly malodorous.

Inasmuch as activated sludge contains a high percentage of nitrogen, so that when dried it makes a high-grade commercial fertilizer for which there is an active demand, it will be seen that if an economical and efficient dewatering process for treating this sludge can be devised, the drawbacks to the use of this process heretofore encountered will be overcome, it being then possible to handle the sludge solids produced in an inoffensive way and the revenue produced from the sale of the fertilizer offsetting the operating cost The gelatinous and colloidal nature of the activated sludge flock, which is practically a biologic jelly, renders it entirely unsuited to dewatering, wihout pretreatment, by any of the commercially accepted methods and means, such, for example, as filter-presses, centrifuges, sandbeds, etc. In view of this fact numerous methods of pretreatment have been developed to bring the sludge into such condition that it can be handled by the ordinary dewatering methods and means. Of these methods of pretreatment probably the most successful and economical is the process disclosed in my co-pending application Serial No. 482,254 filed July 2, 1921, and in my U. S. Letters Patent No. 1,360,427, and No. 1,359,086, which consists primarily in pretreating the sludge with sulphur dioxide gas. As a result, however, of my experiments with my pretreating process hereinabove referred to, I have discovered that certain characteristics are produced in the sludge by such pretreatment which permit the rapid and economical dewatering of the sludge by a process and means entirely novel in the treatment of sewage.

In the drawings I have illustrated, somewhat diagrammatically, apparatus for practicing my novel process of treating sewage sludge.

As hereinabove suggested, the dewatering of the activated sludge without some pretreatment is substantially impossible and even with pretreatment, such as has heretofore been employed, is not entirely satisfactory by the usually accepted methods of pressing, filtering, treatment with centrifuges, etc. By the use of my pretreating process, however, I have discovered that characteristics are imparted to the sludge which permit it to be handled thereafter by a machine well-known in the field of paper manufacture and commonly referred to as a "cylinder wet machine." This machine consists essentially of a slowly rotating half submerged cylinder 2 having its cylindrical surface formed of a fine mesh screen 4 which intercepts the solids in the sludge flow delivered to the machine, these solids, by virtue of their fibrous nature, building up a thin sheet upon the outer face of the submerged portion of the cylinder. As the slow rotation of the cylinder brings the screen surface above the level of the sludge liquor in the container 6, the accumulated sheet of solids drains until it reaches the high point of rotation where a slowly traveling endless felt belt 8 is brought into contact with the surface of the cylinder, with the result that the accumulated solids are picked clean from the screen surface and carried along by the felt belt in a sheet. The felt belt then carries the sheet of solids along over a suction box 10 connected to a vacuum pump (not shown), whereby any free water in the sheet is sucked through the felt, thereby drawing the fibres more closely together and rurther strengthening the sheet formation. After this, the belt passes between squeezing rolls 12 and 14 which are so designed that approximately ten tons of pressure can be exerted on the felt and the sheet carried thereby. The upper of these two squeezing rolls is usually of solid maple and presents a bare wooden surface to the sheet of solids on the belt. As the sheet is squeezed and passes between the squeezing rolls, the woden surface of the upper roller picks the sheet from the felt, the felt passing on practically clean to a whipping and washing device and thence back to the screen cylinder to continue its operation of picking up a sheet of accumulated sludge solids.

The squeezed solids which are built up on the wooden squeezing roll are removed as desired by the operator, or they may be removed in the form of a continuous sheet by an adjustable doctor (not shown).

It will be seen that to utilize a device of this type for forming a sheet or for drying solids by the incidental formation of a sheet, it is important that the solids treated be more or less fibrous in nature. It will be obvious that activated sludge from ordinary sewage will contain quite a large proportion of true paper pulp which is practically pure fibre and that this will contribute to the successful treatment of the sludge by this process. Moreover, if activated sludge is examined under a microscope, it will be seen that it is made up largely of stringy bacteria, each in itself a tiny fibre. These aerobic bacteria, however, decompose rapidly when withdrawn from contact with air in the sewage treatment plant proper, this decomposition resulting in the formation of finely divided colloidal solids which will not build up a sheet on the wire mesh cylinder of the paper machine and either render the machine inoperative when it is attempted to dry the sludge in this manner without pretreatment or, at least, render it highly inefficient.

In order effectively to dewater sludge by the novel means and process herein disclosed, I have found it essential to pretreat the sludge and have found that a very effective pretreatment is that disclosed in my co-pending application and patents hereinabove identified which consists essentially in the use of sulphur dioxide gas. This pretreatment has the two-fold effect, first of sterilizing the sludge to prevent bacterial decomposition with the formation of colloids, and second, of coagulating and agglomerating the sludge flocks, with the result that they rapidly mat themselves into the sheet-like formation requisite for the successful operation of the cylinder wet systems of drying.

In the practice of my invention, activated sludge from the usual aeration tanks is settled in suitable settling tanks to a moisture content of from 97.5% to 99.5%. The settled sludge is then introduced into a suitable treating tank 16 where it is impregnated with sulphur dioxide gas, preferably produced by the burning of crude sulphur in a suitable burner 18 in the manner disclosed in my co-pending application and patents hereinabove indentified. This gas being quite soluble in the diluted sludge, the container or vessel in which the treatment is to take place may be of substantially any shape or size and the gas may be used either hot or cold.

The gas is preferably introduced into the bottom of the impregnating or treating tank through open pipes or perforated grids while the sewage flow is preferably brought into the tank near the top, as at 22, and withdrawn at or near the bottom, as at 24, thus producing a continuous sludge flow through the tank in a counter current to the rising flow of gas. Steam or air injectors 25 serve to entrain and force the gas through the sludge.

After impregnation with the sulphur dioxide gas, the sludge is delivered to the "wet machine" through the pipe 24 which has therein a vertical or upright portion 26 rising to a sufficient height to maintain the sludge at the desired level in the tank 16. This machine is preferably of the general type hereinabove described and, for the purposes for which it is here used, may properly be described as a continuous sludge press of the roller type. This dewatering and pressing machine eliminates substantially all of the free water from the sludge, the effluent thus produced containing but a small proportion of the solid contents of the sludge. The solids lost in the effluent from this machine may be again concentrated and returned to the machine, such concentration being desirable since the percentage of loss of solids by this machine is practically constant regardless of the state of sub-division.

The sludge solids may be taken from this machine in various forms, a suitable form for convenient handling being produced by constantly removing the solids as they are picked up by the wooden pressing roll, whereby the sheet is relatively thin and can be easily crumbled into a form convenient for use as fertilizer. It will be seen that the sludge solids are delivered in substantially cake formation and it is found that these solids as they come from the machine contain less than 75% of water and that they are in splendid condition for final drying in any suitable type of drier, or for drying in the open air if time is not an important factor.

What I claim as new is—

1. The process of treating sewage, which consists in separating the sludge therefrom, sterilizing the sludge, and then gathering the solid contents of the sludge upon a sheet-forming screen, removing the sheet from the screen and squeezing the water therefrom.

2. The process of treating sewage, which consists in concentrating the solid constituents thereof, coagulating and agglomerating the concentrate, then gathering the solid constituents upon a sheet forming screen, removing the sheet from the screen and squeezing the water therefrom.

3. The process of treating sewage to recover commercial products therefrom, which consists in first producing an activated sludge, agglomerating this sludge and then gathering the solid constituents of the sludge upon a sheet-forming screen, removing the sheet from the screen and squeezing the water therefrom.

4. The process of treating sewage to recover commercial products therefrom, which consists in first producing an activated sludge, then treating this sludge with $SO_2$, gathering the solid contents of the sludge upon a sheet-forming screen, removing the sheet from the screen and squeezing the water therefrom.

5. The process of treating sewage to recover commercial products therefrom, which consists in first producing an activated sludge, then sterilizing the sludge to prevent bacterial decomposition and the formation of colloids, coagulating and agglomerating the sludge flocks, and then gathering the solid constituents of the sludge upon a sheet-forming screen, removing the sheet thus formed from the screen and squeezing the water therefrom.

6. The process of treating sewage to recover commercial products therefrom, which consists in producing an activated sludge, passing $SO_2$ gas through this sludge to prevent decomposition of the same, and then gathering the solid constituents of the sludge upon a sheet-forming screen, removing the sheet from the screen, squeezing the water therefrom and drying the cake thus produced.

7. The process of treating sewage to recover commercial products therefrom, which consists in producing an activated sludge, treating this sludge with $SO_2$, gathering the solid constituents of the sludge upon the sheet-forming screen of a cylinder wet machine, removing the sheet from the screen and passing it between squeezing rolls to squeeze the water therefrom, and drying the cake thus produced.

8. The process of treating sewage to recover commercial products therefrom, which consists in concentrating the solid constituents of said sewage, sterilizing and coagulating this concentrate, then gathering the solid constituents upon a sheet-forming screen, transferring the sheet to a porous conveyor and sucking water from the sheet through said conveyor.

9. The process of treating sewage to recover commercial products therefrom, which consists in concentrating the solid constituents of said sewage, sterilizing coagulating this concentrate, then gathering the solid constituents upon a sheet-forming screen, transferring the sheet to a porous conveyor and sucking water from the sheet through said conveyor, then passing said sheet through squeezing rolls and drying the cake thus formed.

10. The method of treating and dewatering sludge consisting in first subjecting the sludge to the fumes of sulphur dioxid, then dewatering the sludge by collecting the solid matter of the sludge upon a moving foraminous surface and then removing the solid matter from said foraminous surface; by a continuously moving surface.

11. The method of treating and removing liquid from activated sewage sludge consisting in subjecting the sludge to the fumes of sulphur dioxid and continuously feeding the sludge into a receptacle and collecting the solid matter of the sludge on a moving foraminous surface and removing the solid matter from said foraminous surface by a moving fabric.

12. The method of treating and dewatering sewage sludge consisting in passing a gas through the sludge and then feeding the sludge into a receptacle and collecting the solid matter of the sludge on the periphery of a foraminous cylinder and removing the solid matter from the foraminous cylinder by a moving fabric.

13. The method of treating and dewatering activated sewage sludge consisting in passing through the sewage sludge sulphur dioxid fumes, then collecting the solid matter of said sewage upon a moving foraminous surface, removing said solid matter from said foraminous surface in the form of a web or sheet upon a moving fabric, and then subjecting said web to a pressing action.

Signed at New York city, New York, this 10th day of March 1922.

ANGUS MACLACHLAN.